United States Patent [19]
Zaid

[11] Patent Number: 5,474,704
[45] Date of Patent: Dec. 12, 1995

[54] REGENERATION COMPOSITIONS FOR CATIONIC EXCHANGE RESINS

[75] Inventor: Najib H. Zaid, Sterling, Kans.

[73] Assignee: Jacam Chemical Partners, Ltd., Sterling, Kans.

[21] Appl. No.: 100,572

[22] Filed: Jul. 30, 1993

[51] Int. Cl.⁶ ..................................................... C09K 3/00
[52] U.S. Cl. ............... 252/182.12; 252/142; 252/174.19; 252/558; 210/674; 521/26
[58] Field of Search ............................ 252/182.12, 182.3, 252/142, 174.19, 558; 521/26; 210/674

[56] References Cited

U.S. PATENT DOCUMENTS

| | | | |
|---|---|---|---|
| 3,454,503 | 7/1969 | Blankenhorn et al. | 210/674 |
| 3,872,020 | 3/1975 | Yamagishi et al. | 252/142 |
| 3,887,498 | 6/1975 | Kuhajek et al. | 210/674 |
| 4,116,860 | 9/1978 | Kunin | 252/192 |
| 4,540,715 | 9/1985 | Waatti et al. | 521/26 |
| 4,612,137 | 9/1986 | Kuroda et al. | 252/174.19 |
| 4,664,811 | 5/1987 | Operhofer | 210/674 |
| 4,749,508 | 6/1988 | Cockrell et al. | 252/142 |
| 4,753,736 | 6/1988 | Reichgott | 210/674 |
| 4,839,086 | 6/1989 | Zaid | 252/182.3 |
| 5,041,239 | 8/1991 | Rörig et al. | 252/142 |
| 5,310,488 | 5/1994 | Hansen et al. | 210/674 |

OTHER PUBLICATIONS

Harcros Chemicals, Inc. data sheet on Sodium ferrocyanide
Specification sheet for glucono delta lactone F.C.C. by PMP Fermentation Products.
Material Safety Data Sheet for Glucono Delta Lactone F.C.C. by PMP Fermentation Paper on Glucono–delta–lactone "Fujisawa".
Specification sheet on PMP Sodium Gluconate Material Safety Data Sheet for Sodium Gluconate F.C.C.
Specification sheet onPMP Gluconic Acid 50% (GA–4).

*Primary Examiner*—Edward A. Miller
*Attorney, Agent, or Firm*—Hovey, Williams, Timmons & Collins

[57] ABSTRACT

Improved compositions for the treatment and regeneration of ion exchange resin beds typically used in water softening systems are provided, which possess enhanced iron sequestering capabilities. The compositions include citric acid and a salt of citric acid, together with an iron sequestration-enhancing amount of an agent including a quantity of a source of gluconic acid or salt of gluconic acid. Preferred agents include gluconic acid, the alkali metal gluconates, glucono lactone and mixtures thereof. The compositions are advantageously formulated as dry products, which can be mixed with a preponderant amount of sodium chloride to yield regenerating media.

25 Claims, No Drawings

REGENERATION COMPOSITIONS FOR CATIONIC EXCHANGE RESINS

BACKGROUND OF THE INVENTION

1. Field of the Invention

The present invention is broadly concerned with improved compositions for the regeneration for cation exchange resins commonly used in household or industrial contexts for the softening of water. The compositions of the invention are generally of the type disclosed in U.S. Pat. No. 4,839,086, including respective amounts of citric acid and a salt of citric acid, but are improved by the addition of an agent for enhancing the iron sequestering capability thereof; this agent advantageously includes a quantity of a gluconic acid source or salt of gluconic acid.

2. Description of the Prior Art

Water softening systems have long been used in households and by industry to replace hardness cations such as calcium and magnesium with sodium ions. This is accomplished by passing an incoming water supply through a bed of sodium charged cation exchange resin beads or particles. As the water passes through the cation exchange resin bed, the incident hardness cations are exchanged for the sodium ions of the bed. In the course of time, the ion exchange resin bed becomes saturated with hardness cations removed from the incoming water, and it is necessary to recharge the bed by passing a brine solution primarily consisting of sodium chloride through the resin bed. This replenishes the bed with sodium ions and removes the unwanted calcium, magnesium, or other ions previously removed from the treated water.

Over time, the exchange capacity of an ion exchange resin bed deteriorates as impurities in the incoming water collect in the resin bed and are not removed by periodic recharging. At some point, depending primarily on the characteristics of the incoming water supply, the resin bed becomes unacceptably "fouled", i.e. the resin bed's capacity to soften water has been diminished to an extent that it must be specially treated to restore softening capacity.

Although a number of factors can lead to fouling of an ion exchange resin bed, perhaps the greatest single contributing factor is the presence of iron in an incoming water supply. Iron can exist in several valence states in water, the most common being the ferrous and ferric states. It is most desirable to maintain the iron in the ferrous state, inasmuch as ferrous iron can readily be removed during conventional resin bed regeneration. However, ferrous iron tends to become oxidized to the ferric state after being exchanged onto a resin bed, which the makes its removal very difficult and can cause the resin beads to split.

In the case of certain relatively high pH regenerating compositions, the resulting brine solutions are cloudy because of the presence of carbonates. In use, these carbonates can be effectively "filtered" by the resin beads thus lowering the bed efficiency and contributing to the need for frequent bed regeneration.

A number of prior compositions have been proposed for use as ion exchange resin bed regenerants. For example, U.S. Pat. No. 4,540,715 describes the use of a surfactant and an alkali metal citrate in a regenerating composition. Other prior systems have made use of citric acid as a sequestering agent for iron. These prior compositions have proven less than entirely satisfactory, however, principally because of their inability to properly control the iron problems described previously.

U.S. Pat. No. 4,839,086 represents a distinct breakthrough in the art and describes greatly improved regenerating compositions made up of, preferably, respective minor amounts of citric acid, a salt of citric acid (e.g., sodium citrate), and an anti-caking agent. Compositions in accordance with this patent can be mixed with a preponderant amount of sodium chloride to provide a greatly improved product for regeneration of cation exchange resins.

SUMMARY OF THE INVENTION

The present invention represents an improvement over the citric acid-citrate compositions described in U.S. Pat. No. 4,839,086, which is incorporated by reference herein. Generally speaking, the invention hereof involves the addition to such compositions of an agent for enhancing the iron sequestering capabilities thereof. Such an agent includes a quantity of a source of gluconic acid or salt of gluconic acid. Preferably, the agent is selected from the group consisting of gluconic acid, the alkali metal gluconates, glucono lactone and mixtures thereof.

Improved compositions in accordance with the invention can be mixed with a preponderant amount of sodium chloride to form a dilutable resin treatment media; the latter is conveniently formulated as compacted pellets.

DETAILED DESCRIPTION OF THE PREFERRED EMBODIMENTS

Preferred compositions designed for addition to sodium chloride to give regenerating media for cation exchange resins include individual quantities of citric acid and a salt of citric acid, together with an agent for enhancing the iron sequestration capabilities of the compositions. Such agents include a quantity of a source of gluconic acid or salt of gluconic acid.

In preferred forms, the agent is present in these compositions at a level of from about 1–90% by weight, and more preferably at a level of from about 10–60% by weight.

One preferred agent for use in the invention is glucono delta lactone (GDL) (CAS #90-80-2). This product having the molecular formula $C_6H_{10}O_6$ is in the form of a white, practically odorless crystalline powder. It is an intramolecular ester formed by the dehydration of one mole of water from gluconic acid. Glucono delta lactone has been extensively utilized in the food industry as an acidulent in baking powders, as a coagulant of milk products, and as an agent for lowering the pH of milk products. GDL is soluble in water, being hydrolyzed slowly in aqueous systems to produce gluconic acid. The pH of a 1% aqueous solution of GDL at 25° C. is 3.5, which lowers to 2.7 within 2 hours. GDL is described in an MSDS and product specification sheet distributed by PMP Fermentation Products Inc. of Peoria, Ill.; these documents are incorporated by reference herein. Where GDL is employed, it is preferably used in the dry compositions designed for addition to sodium chloride at a level of from about 5–90% by weight, and more preferably from about 5–20% by weight.

It is of course possible to employ gluconic acid as the agent in the compositions of the invention. However, gluconic acid is a liquid, making it difficult to use in preferred dry formulations. Also, any other additive which will yield gluconic acid in an aqueous system can be used in the present invention.

Another family of agents useful in the invention are the salts of gluconic acid. The most preferred salts are the alkali metal salts, and particularly sodium and potassium gluconate. Where the latter are employed, they should be used at a level of from about 1–60% by weight, and more preferably from about 40–60% by weight.

The salt of citric acid used in the compositions hereof is present in substantial excess as compared with the amount of citric acid present. Thus, the citrate is normally used at a level of from about 10–90% by weight, more preferably from about 40–90% by weight, whereas the citric acid is present at a level of from about 0.1–10% by weight, and more preferably from about 0.5–5% by weight. The single most preferred salt of citric acid is sodium citrate, although other salts are possibilities.

In order to enhance the flowability of the dry compositions of the invention, use is also made of a minor amount of an anti-caking agent, e.g, an alkyl substituted naphthalene sulfonate.

As indicated above, the dry, powder compositions are designed for mixture with sodium chloride in order to provide a complete regeneration medium. In such complete systems, the citric acid is present at a very low level, typically from about 0.000125–0.05% by weight, whereas the salt of citric acid is present at a level of from about 0.01–0.90% by weight. On the other hand, the sodium chloride is the preponderant constituent and is used at a level of from about 99–99.75% by weight. The glucono agent is present in the final salt regeneration media at a level of from about 0.00125–0.90% by weight, and more preferably from about 0.00125–0.20% by weight.

The dry compositions designed for addition to sodium chloride are produced by initially blending anhydrous citric acid with the sulfonate anti-caking agent in an upright rotating blender. Following thorough mixing of these two components, the citric acid salt and the glucono agent are then added followed by further blending to assure homogeneity. This preblended, dry material can then be used to manufacture final regenerative media. Such procedures involve initial blending of the material with a preponderant amount of sodium chloride, followed by conventional pelleting to yield pellets comprising primarily sodium chloride, with the additive package of the invention homogeneously mixed and compacted therewith.

The regenerating media can then be dispersed in water and used on a routine basis for the regeneration and treatment of ion exchange resin beds. These aqueous, saturated use solutions have a relatively low pH on the order of about 4–8, and more preferably from about 5–7, to assist in maintenance of iron ions in the desirable ferrous state. Generally speaking, the regenerating media are dispersed in water at a level of from about 0.01–2.60 pounds of media per gallon of water, and more preferably from about 0.2–0.5 lbs/gal. This results in final aqueous use solutions containing from about 0.001–0.025% by weight citric acid; from about 0.08–0.45% by weight salt of citric acid; and from about 0.01–0.1% by weight of the glucono agent.

The following examples illustrate preferred embodiments of the invention and use thereof. It is to be understood, however, that this example is presented by way of illustration only and nothing therein should be taken as a limitation upon the overall scope of the invention.

EXAMPLE

In this example, a series of regenerating compositions were tested using iron-fouled cation exchange resins. In particular, four separate test compositions were prepared:

1. Straight sodium gluconate;

2. A citric acid-salt of citric acid composition as set forth in U.S. Pat. No. 4,839,086 containing 89.9% by weight sodium citrate, 1% by weight citric acid and 0.1% by weight anti-caking agent;

3. A composition in accordance with the present invention including 89.4% by weight sodium citrate, 0.5% by weight citric acid, 10% by weight glucono delta lactone, and 0.1% by weight anti-caking agent (Petro AG Special Superfine Powder); and 4. A composition in accordance with the present invention including 50% by weight sodium citrate, 48.15% by weight sodium gluconate, 1.75% by weight citric acid, and 0.1% by weight Petro AG anti-caking agent.

Compositions 2–4 were prepared as described above and in U.S. Pat. No. 4,839,086.

In order to test these compositions, 50 g of fresh, commercially available cationic exchange resin (divinylbenzene-sulfonate) was weighed into a 400 ml beaker, and 100 ppm of ferrous sulfate dissolved in water was added to the resin and stirred for two hours. The liquid was then drained from the resin. Two hundred g of 10% salt brine (20 g of sodium chloride and 100 g of water) was prepared containing 500 ppm of the respective test composition, followed by addition of this supplemented brine to the resin and subsequent stirring for two hours. The liquid fraction was poured from the resin and filtered into a 500 ml volumetric flask; the flask was then filled to the 500 ml mark with deionized water. The contents of the volumetric flask were then analyzed for iron using a Hach test kit or atomic absorption.

The results of these tests demonstrated that the compositions of the invention gave significantly greater iron removal as compared with sodium gluconate or the prior art composition. That is, straight sodium gluconate removed 5 ppm of the iron whereas the patented composition removed 12 ppm. The two compositions of the present invention, however, removed 25 ppm (No. 3) and 27 ppm (No. 4). The visual condition of the resin in the straight sodium gluconate test was "dirty", whereas in the remaining tests, the resin was clear and clean.

In another test, the above described compositions were added at a level of 50 ppm each to a concentrated brine sample subject to yellowing. The supplemented brines were then allowed to stand for 72 hours. The straight sodium gluconate test composition, and that of U.S. Pat. No. 4,839,086 exhibited a yellow color (as did a non-supplemented brine blank), whereas the brines supplemented with the compositions of the invention were clear.

I claim:

1. In a composition for addition to sodium chloride to give a regenerating medium for cation exchange resin including individual quantities of citric acid and a salt of citric acid, the improvement which comprises an agent present in an amount for enhancing the iron sequestering capability of said composition, said agent including a quantity of a source of gluconic acid or salt of gluconic acid.

2. The composition of claim 1, said agent being selected from the group consisting of gluconic acid, the alkali metal gluconates, glucono lactone and mixtures thereof.

3. The composition of claim 1, said agent being present at a level of from about 1–90% by weight in said composition.

4. The composition of claim 3, said level being from about 10–60% by weight.

5. The composition of claim 3, said agent being glucono lactone, and being present at a level of from about 5–90% by weight.

6. The composition of claim 5, said level being from about 5–20% by weight.

7. The composition of claim 3, said agent being sodium gluconate and being present at a level of from about 1–60% by weight.

8. The composition of claim 7, said level being from about 40–60% by weight.

9. The composition of claim 1, said salt of citric acid being sodium citrate.

10. The composition of claim 1, said salt of citric acid being present in substantial excess as compared with said citric acid.

11. The composition of claim 10, said salt of citric acid being present at a level of from about 10–90% by weight, said citric acid being present at a level of from about 0.1–10% by weight.

12. The composition of claim 11, said salt of citric acid level being from about 40–90% by weight, and said citric acid level being from about 0.5–5% by weight.

13. The composition of claim 1, including a minor amount of an anti-caking agent.

14. The composition of claim 13, said anti-caking agent being an alkyl substituted naphthalene sulfonate.

15. A composition for regenerating a cation exchange resin comprising:

a quantity of sodium chloride; and respective minor amounts of citric acid, a salt of citric acid and an agent including a quantity of a source of gluconic acid or salt of gluconic acid, all of the foregoing being mixed with said sodium chloride.

16. The composition of claim 15, said citric acid being present at a level of from about 0.000125–0.05% by weight.

17. The composition of claim 15, said salt of citric acid being present at a level of from about 0.01–0.90% by weight.

18. The composition of claim 15, said sodium chloride being present at a level of from about 99–99.75% by weight.

19. The composition of claim 15, said agent being selected from the group consisting of gluconic acid, the alkali metal gluconates, glucono lactone and mixtures thereof.

20. The composition of claim 15, said agent being present at a level of from about 0.00125–0.90% by weight.

21. The composition of claim 15, said salt of citric acid being an alkali metal salt.

22. The composition of claim 21, said salt being sodium citrate.

23. The composition of claim 15, including a minor amount of an anti-caking agent.

24. The composition of claim 23, said anti-caking agent being an alkyl substituted naphthalene sulfonate.

25. The composition of claim 15, said composition being in the form of compacted pellets.

* * * * *